United States Patent
Hayakawa et al.

(10) Patent No.: US 11,945,341 B2
(45) Date of Patent: Apr. 2, 2024

(54) SEAT CONNECTION STRUCTURE

(71) Applicant: HONDA MOTOR CO., LTD., Tokyo (JP)

(72) Inventors: Hirotaka Hayakawa, Tokyo (JP); Daisuke Ohkawa, Tokyo (JP); Shungo Chino, Tokyo (JP); Yushiro Tachibana, Tokyo (JP); Takashi Nitta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/947,196

(22) Filed: Sep. 19, 2022

(65) Prior Publication Data
US 2023/0101545 A1    Mar. 30, 2023

(30) Foreign Application Priority Data
Sep. 24, 2021    (JP) .................................. 2021-155780

(51) Int. Cl.
*B60N 2/015*    (2006.01)
(52) U.S. Cl.
CPC .................................. *B60N 2/015* (2013.01)
(58) Field of Classification Search
CPC .................................. B60N 2/015; B60N 2/36
USPC .......................................................... 296/63
See application file for complete search history.

(56) References Cited

U.S. PATENT DOCUMENTS

| | | | | |
|---|---|---|---|---|
| 3,294,443 | A * | 12/1966 | Beckman | B60N 2/366 297/378.13 |
| 7,658,428 | B2 * | 2/2010 | Tietje | B60N 2/42709 296/63 |
| 8,882,169 | B2 * | 11/2014 | Tanaka | B60N 2/2245 296/65.03 |
| 10,967,760 | B2 * | 4/2021 | Andersson | B60N 2/015 |
| 2004/0201265 | A1 * | 10/2004 | Ichikawa | B60N 2/015 297/354.13 |
| 2006/0249972 | A1 * | 11/2006 | Lutzka | B60N 2/206 296/65.03 |
| 2017/0008432 | A1 * | 1/2017 | Matsui | B60N 2/753 |
| 2018/0170218 | A1 * | 6/2018 | Nowland | B60N 2/01 |
| 2018/0170219 | A1 * | 6/2018 | Deschamps | B60N 2/305 |

FOREIGN PATENT DOCUMENTS

| | | | | |
|---|---|---|---|---|
| DE | 102010018638 A1 * | 11/2011 | | B60R 22/22 |
| FR | 3024415 A1 * | 2/2016 | | B60R 21/13 |
| JP | 2007-145099 | 6/2007 | | |
| JP | 2007-331582 | 12/2007 | | |

\* cited by examiner

*Primary Examiner* — Amy R Weisberg
*Assistant Examiner* — Sara Laghlam
(74) *Attorney, Agent, or Firm* — Amin, Turocy & Watson, LLP (57) ABSTRACT

A seat connection structure includes a reinforcing member and a rear seat. The reinforcing member reinforces a rear floor panel and left and right rear wheel houses. The rear seat is disposed in front of a vehicle body of the reinforcing member, and is connected to the reinforcing member via left and right fixing members. The left and right fixing members connect the seat back of the rear seat and the reinforcing member, and are connected to face a front surface portion of the reinforcing member formed on a front side of the vehicle body and facing a vehicle width direction.

7 Claims, 7 Drawing Sheets

SEAT CONNECTION STRUCTURE

CROSS-REFERENCE TO RELATED APPLICATION

Priority is claimed on Japanese Patent Application No. 2021-155780, filed in Japan on Sep. 24, 2021, the entire content of which is incorporated herein by reference.

BACKGROUND OF THE INVENTION

Field of the Invention

The present invention relates to a seat connection structure.

Description of Related Art

As a vehicle seat connection structure, for example, there is known a vehicle seat connection structure in which a reinforcing member is provided along a wheel house inner, and a bracket of a seat back (hereinafter referred to as a seat hinge) is supported at an end portion of the reinforcing member to be rotatable (rotatable) about a support bolt. In the seat connection structure, the end portion of the reinforcing member is disposed in the front-rear direction of the vehicle body, and the support bolt is fastened to the end of the reinforcing member in a vehicle width direction. That is, a seat hinge is supported by the support bolt at the end portion of the reinforcing member from the inside in the vehicle width direction (see, for example, Japanese Unexamined Patent Application, First Publication No. 2007-145099 and Japanese Unexamined Patent Application, First Publication No. 2007-331582).

SUMMARY OF THE INVENTION

However, in the conventional seat connection structure, a seat hinge is supported from the inside in the vehicle width direction at the end portion of the reinforcing member by fastening the support bolts in the vehicle width direction. Therefore, for example, it is difficult to transmit (release) a load input to the seat (specifically, the seat back) at the time of front collision or rear collision from the seat hinge to the reinforcing member (that is, the vehicle body) via the support bolt. Therefore, it is conceivable that the seat hinge is deformed or damaged by the load input to the seat back.

Here, as means for transmitting the load input to the seat back from the seat hinge to the vehicle body via the support bolt, for example, it is conceivable to increase the strength and rigidity of the seat hinge and the support bolt. In order to increase the strength and rigidity of the seat hinge and the support bolt, for example, it is conceivable to reinforce the seat hinge and the support bolt with a reinforcing member or to increase the shape of the seat hinge and the support bolt. However, enlarging the reinforcing member and the shape leads to an increase in the number of components and an increase in size, which is not preferable from the viewpoint of weight reduction, for example.

An aspect according to the present invention has been made in view of such circumstances, and an object thereof is to provide a seat connection structure capable of suppressing an increase in the number of components and an increase in size and capable of transmitting a load input to a seat to a vehicle body.

In order to address the above issue and achieve the object, the present invention adopts the following aspects.

(1): A seat connection structure of an aspect according to the present invention is a seat connection structure including a reinforcing member that reinforces at least one of a floor and a wheel house, and a seat disposed in front of a vehicle body of the reinforcing member and connected to the reinforcing member via a fixing member, in which the fixing member connects a seat back of the seat and the reinforcing member, and is connected to a front portion of the reinforcing member facing a front surface portion formed to face in a vehicle width direction on the front side of the vehicle body.

According to this configuration, the seat back is connected to the reinforcing member via the fixing member, and the fixing member is connected to the front surface portion of the reinforcing member. Here, the front surface portion of the reinforcing member is formed on the front side of the vehicle body to face in the vehicle width direction. Therefore, by connecting the fixing member to the front surface portion of the reinforcing member, the strength and rigidity of the fixing member against the load of the vehicle body in the front-rear direction can be enhanced.

As a result, for example, the load of the vehicle body in the front-rear direction input to the seat (specifically, the seat back) at the time of front collision or rear collision can be efficiently transmitted (released) from the fixing member to the reinforcing member (that is, the vehicle body).

In order to efficiently transmit the load of the vehicle body in the front-rear direction from the fixing member to the reinforcing member, for example, it is not necessary to reinforce the fixing member with a new reinforcing member or to increase the strength and rigidity of the fixing member by forming the fixing member to have a large shape, and the weight can be reduced.

As a result, an increase in the number of components and an increase in size can be suppressed, and the load of the vehicle body in the front-rear direction input to the seat back by front collision or rear collision can be transmitted to the reinforcing member (that is, the vehicle body). Therefore, it is possible to suppress deformation and breakage of the fixing member due to the load of the vehicle body in the front-rear direction.

Hereinafter, front collision or rear collision may be simply called "collision," and the load of the vehicle body in the front-rear direction may be simply called "load."

(2): In the above aspect (1), the reinforcing member may include a wheel house reinforcing member that reinforces the wheel house, and a floor cross member that reinforces the floor, and the fixing member may be connected to an overlapping portion where the wheel house reinforcing member and the floor cross member overlap.

According to this configuration, the reinforcing member includes the wheel house reinforcing member and the floor cross member. The fixing member is connected to the overlapping portion where the wheel house reinforcing member and the floor cross member overlap. Therefore, for example, when the overlapping portion is joined, it is possible to overlap the fixing member with the overlapping portion and simultaneously connect the overlapping member.

That is, the strength and rigidity of the fixing member against a load can be enhanced without reinforcing the fixing member with the reinforcing member or forming the fixing member to have a large shape. Thus, the load input from the seat back due to collision can be efficiently transmitted from the fixing member to the wheel house reinforcing member and the floor cross member to be dispersed. Therefore, deformation and breakage of the fixing member due to a load can be more favorably suppressed.

(3): In the above aspect (2), a first closed cross section formed by the wheel house reinforcing member and the wheel house and a second closed cross section formed by the floor cross member and the floor may be further included, the first closed cross section and the second closed cross section may communicate with each other, a pair of the wheel house reinforcing members may be provided on the left and right sides in the vehicle width direction corresponding to the pair of wheel houses provided on the left and right sides in the vehicle width direction, and the reinforcing member composed of the pair of the wheel house reinforcing members and the floor cross member may be formed in a U-shape in a front view from a vehicle front direction.

According to this configuration, the wheel house reinforcing member and the wheel house form the first closed cross section. The second closed cross section is formed by the floor cross member and the floor. Further, the first closed cross section and the second closed cross section are communicated with each other. Therefore, the strength and rigidity of the wheel house reinforcing member and the floor cross member (that is, the reinforcing member) are secured. Further, a pair of wheel house reinforcing members and a floor cross member form a reinforcing member in a U-shape in a front view. Thus, the strength and rigidity of the reinforcing member can be sufficiently secured.

That is, the load input from the seat back and the fixing member due to collision can be efficiently supported by the reinforcing member (that is, the vehicle body). As a result, it is possible to more favorably suppress deformation and breakage of the fixing member due to a load without reinforcing the fixing member with a new reinforcing member or forming the fixing member to have a large shape.

In addition, a pair of wheel house reinforcing members and a floor cross member form a reinforcing member in a U-shape in a front view, and a fixing member is connected to the reinforcing member. Therefore, for example, torsional rigidity of the reinforcing member against a load input during traveling of the vehicle can be increased. As a result, the stability of the seat while the vehicle is traveling can be improved.

(4): In the above aspect (3), the reinforcing member may include a bulkhead provided in at least one of an inside of the first closed cross section and an inside of the second closed cross section, and the bulkhead may overlap the overlapping portion and the fixing member and be simultaneously connected to the overlapping portion and the fixing member.

According to this configuration, the bulkhead is provided inside the first closed cross section and the second closed cross section of the reinforcing member. Further, the bulkhead is simultaneously connected to the overlapping portion and the fixing member in an overlapping state. Thus, the reinforcing member can be reinforced by the bulkhead. As a result, the strength and rigidity of the reinforcing member are more favorably secured, and the load input from the seat back and the fixing member due to collision can be more efficiently supported by the reinforcing member (that is, the vehicle body).

(5): In the above aspect (1), the front surface portion may extend to be inclined upward toward the rear of the vehicle, and the fixing member may extend from the front surface portion toward the seat back in a direction perpendicular to the front surface portion.

According to this configuration, the seat back is connected to the front surface portion of the reinforcing member by the fixing member, and the fixing member extends to the seat back in the direction perpendicular to the front surface portion. Therefore, the load input to the seat back upon collision can be more efficiently transmitted to the reinforcing member by the fixing member. As a result, the load input to the seat back upon collision can be more efficiently supported by the reinforcing member (that is, the vehicle body).

(6): In the above aspect (1), the fixing member may include a first fixing portion disposed along the front surface portion, and a second fixing portion which extends toward the seat back from an end portion of the first fixing portion on an outer side in the vehicle width direction and to which a connection portion is connected to the seat back, and may have a flange formed in an L-shape in a plan view by the first fixing portion and the second fixing portion and forming an outer peripheral edge.

According to this configuration, the fixing member is formed in an L-shape by the first fixing portion and the second fixing portion, and the outer peripheral edge of the fixing member is formed by the flange. Therefore, the strength and rigidity of the fixing member can be enhanced by the L-shape or the flange. As a result, the load input to the seat back upon collision can be more efficiently transmitted to the reinforcing member (that is, the vehicle body) by the fixing member.

(7): In the above aspect (6), the second fixing portion of the fixing member may have a bead portion extending from the connection portion to a bending portion formed by the first fixing portion and the second fixing portion being intersected.

According to this configuration, the bead portion is formed in the second fixing portion of the fixing member. That is, the bead portion extends from the connection portion of the second fixing portion to the bending portion (the bending portion of the first fixing portion and the second fixing portion formed in an L-shape). Therefore, the strength and rigidity of the fixing member can be further enhanced. As a result, the load input to the seat back upon collision can be more efficiently transmitted to the reinforcing member (that is, the vehicle body) by the fixing member.

(8): In the above aspect (1), the fixing member may include a first fixing portion disposed along the front surface portion, and a second fixing portion which extends toward the seat back from an end portion of the first fixing portion on an outer side in the vehicle width direction, and may have another bead portion formed in an L-shape in a plan view by the first fixing portion and the second fixing portion, and formed along the outer peripheral edge.

According to this configuration, the fixing member is formed in an L-shape by the first fixing portion and the second fixing portion, and another bead portion is formed along the outer peripheral edge of the fixing member. Therefore, the strength and rigidity of the fixing member can be enhanced by the L-shape or other beads. As a result, the load input to the seat back upon collision can be more efficiently transmitted to the reinforcing member (that is, the vehicle body) by the fixing member.

According to the aspect of the present invention, an increase in the number of components and an increase in size can be suppressed, and a load input to the seat can be transmitted to the vehicle body.

DETAILED DESCRIPTION OF THE INVENTION

Hereinafter, a seat connection structure in an embodiment of the present invention will be described in accordance with the drawings. Hereinafter, in the drawings, an arrow FR indicates a forward direction with respect to the vehicle, an arrow UP indicates an upward direction with respect to the vehicle, and an arrow LH indicates a leftward direction with respect to the vehicle.

<Vehicle>

Figure 1:
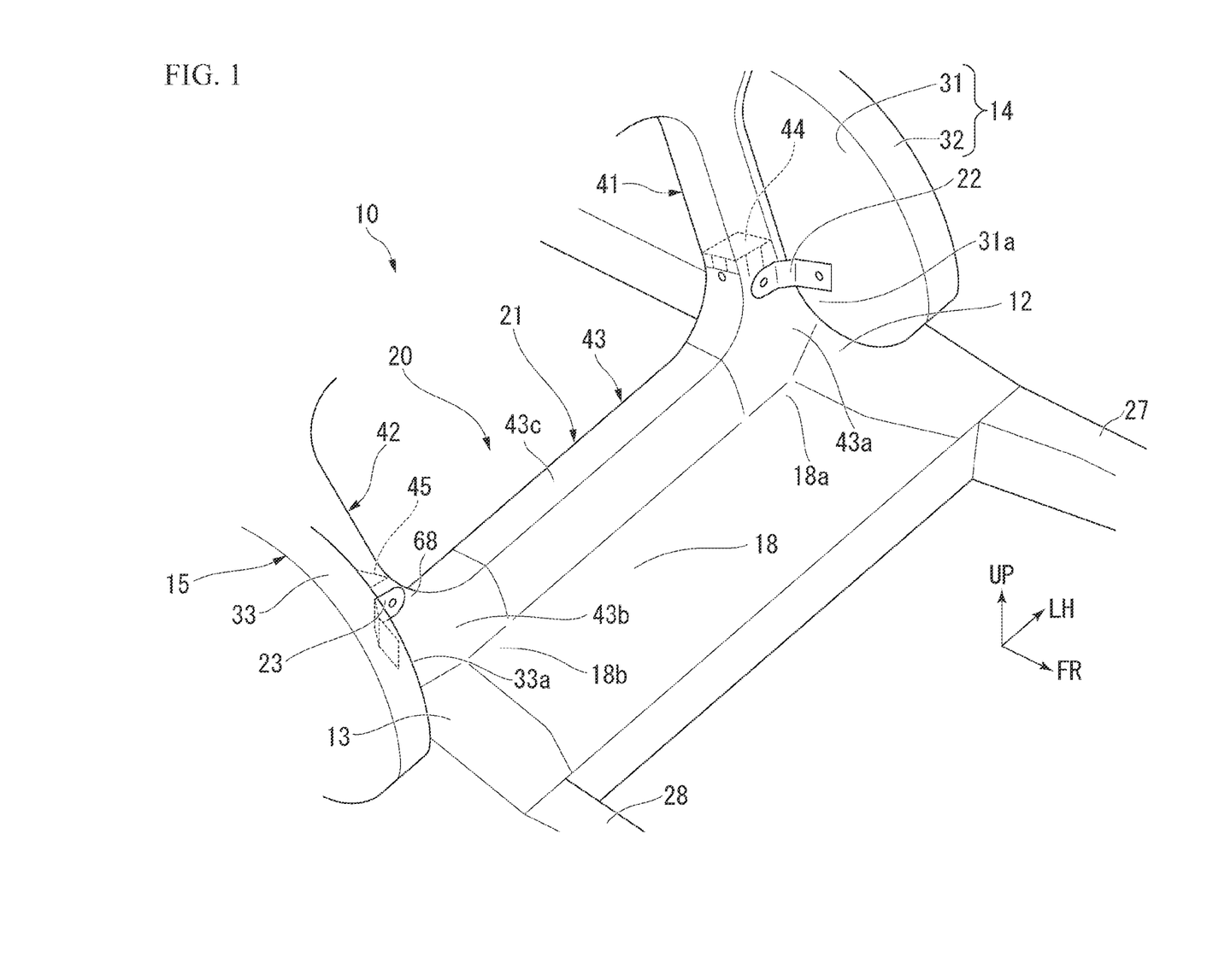
FIG. 1 is a perspective view of a vehicle including a seat connection structure according to an embodiment of the present invention from the front right.
Figure 2:
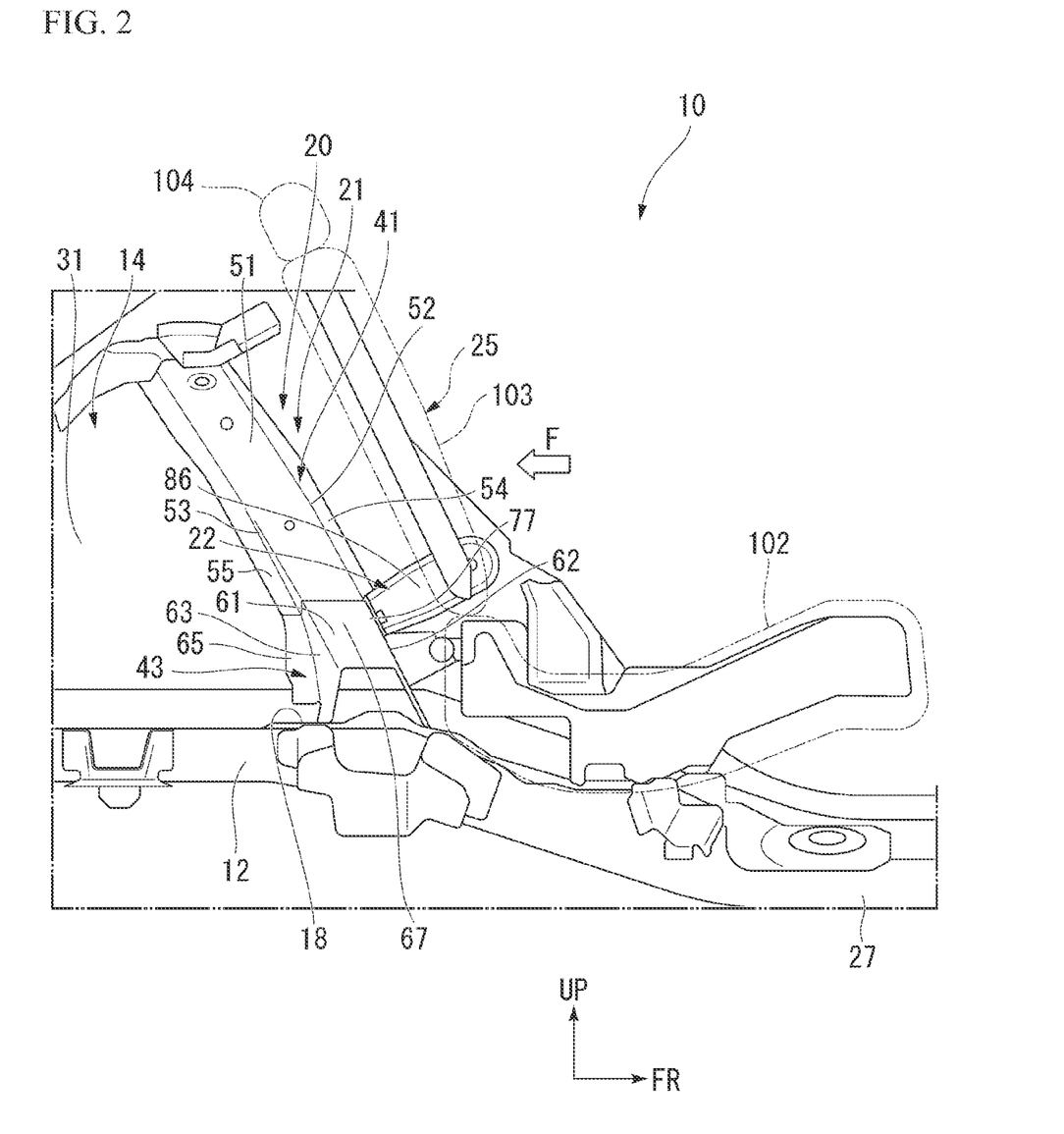
FIG. 2 is a cross-sectional view illustrating a vehicle including the seat connection structure according to the embodiment.

As illustrated in FIGS. 1 and 2, a vehicle 10 includes left and right rear frames 12 and 13, left and right rear wheel houses (a pair of wheel houses) 14 and 15, a rear floor panel (floor) 18, and a seat connection structure 20.

<Rear Frame>

The left rear frame 12 is provided on the left outer side in the vehicle width direction in the lower portion of the rear portion of the vehicle body, and extends toward the rear side of the vehicle from the rear end portion of a left side sill 27. The right rear frame 13 is provided on the right outer side in the vehicle width direction in the lower portion of the rear portion of the vehicle body, and extends toward the rear side of the vehicle from the rear end portion of a right side sill 28.

The left rear frame 12 and the right rear frame 13 are, for example, highly rigid frame members that form a part of the vehicle body frame by being formed in a hollow closed cross section. The left side sill 27 and the right side sill 28 are, for example, highly rigid frame members that form a part of the vehicle body frame by being formed in a hollow closed cross section.

<Rear Wheel House>

The left rear frame 12 is provided with a left rear wheel house 14. The left rear wheel house 14 is, for example, a member that houses the left rear wheel and the left rear suspension therein. The left rear wheel house 14 includes a left inner wheel house 31 and a left outer wheel house 32. The left inner wheel house 31 is connected (joined) to the left rear frame 12. The left outer wheel house 32 is joined to the left outer side in the vehicle width direction of the left inner wheel house 31.

The right rear frame 13 is provided with a right rear wheel house 15. The right rear wheel house 15 is, for example, a member that houses the right rear wheel and the right rear suspension therein. The right rear wheel house 15 includes a right inner wheel house 33 and a right outer wheel house (not illustrated). The right inner wheel house 33 is connected (joined) to the right rear frame 13. The right outer wheel house is joined to the right outer side in the vehicle width direction of the right inner wheel house 33.

<Rear Floor Panel>

The rear floor panel 18 is provided between the left rear frame 12 and the right rear frame 13. The rear floor panel 18 forms a floor surface of a vehicle interior. A floor cross member 43 (described later) of the reinforcing member 21 is connected to the rear floor panel 18 from the vehicle interior side.

<Seat Connection Structure>

The seat connection structure 20 is connected to the left inner wheel house 31, the right inner wheel house 33, the rear floor panel 18, and the like. A rear seat 25 described later is supported by the seat connection structure 20. The seat connection structure 20 includes the reinforcing member 21, left and right fixing members (fixing members) 22 and 23, and the rear seat (seat) 25.

[Reinforcing Member]

The reinforcing member 21 includes a left wheel house reinforcing member (wheel house reinforcing member) 41, a right wheel house reinforcing member (wheel house reinforcing member) 42, a floor cross member 43, a left bulkhead (bulkhead) 44, and a right bulkhead (bulkhead) 45.

(Wheel House Reinforcing Member)

Figure 3:
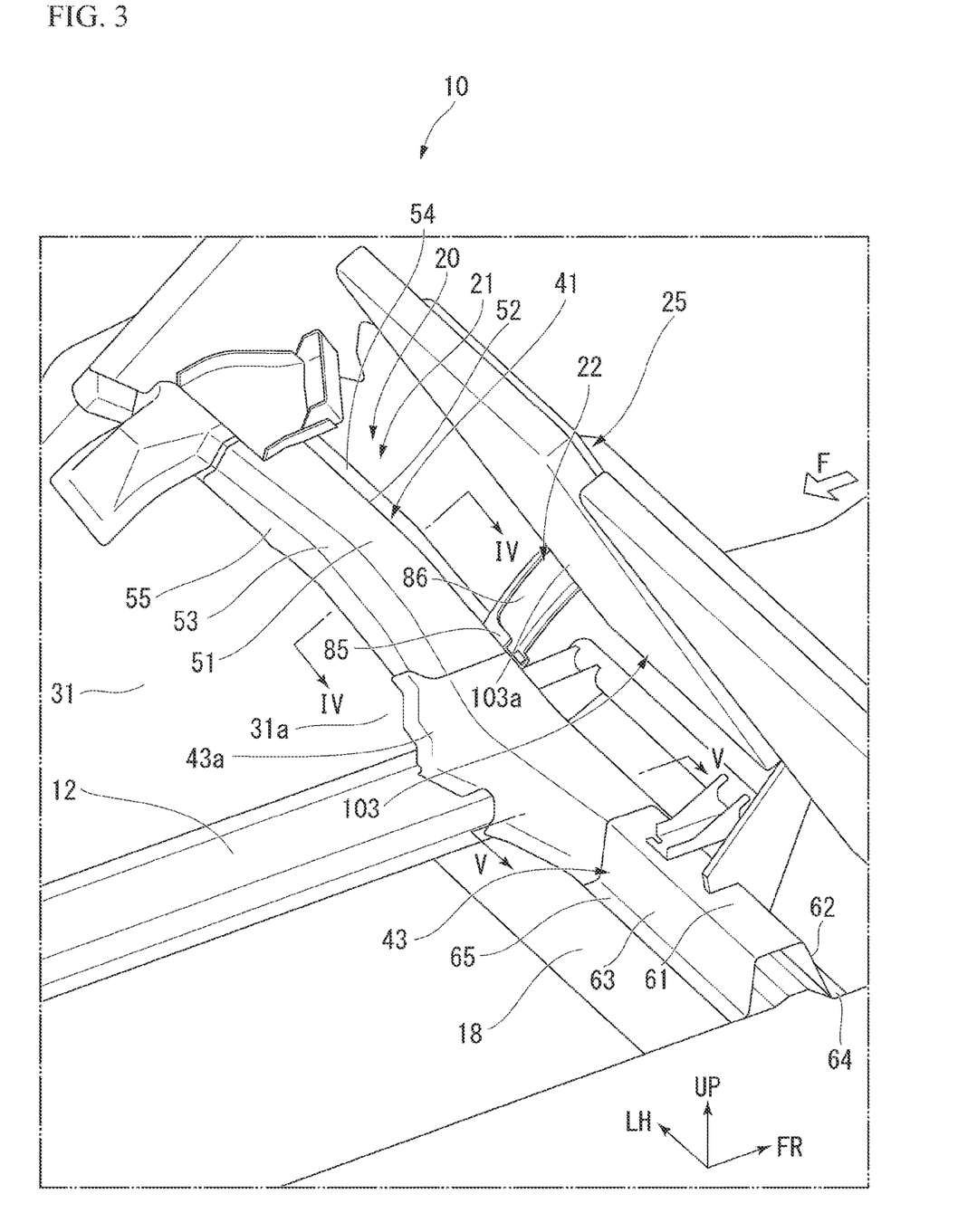
FIG. 3 is a perspective view of a vehicle including a seat connection structure according to an embodiment of the present invention from the rear right.
Figure 4:
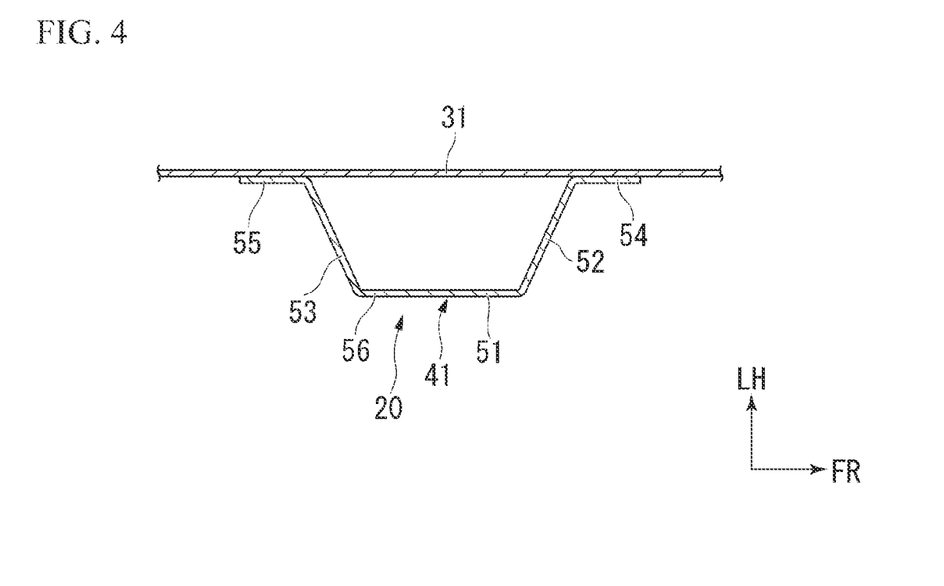
FIG. 4 is a cross-sectional view along line IV-IV in FIG. 3.

As illustrated in FIGS. 3 and 4, the left wheel house reinforcing member 41 is connected to the left inner wheel house 31 from the inside in the vehicle width direction (that is, the vehicle interior side). Specifically, the left wheel house reinforcing member 41 includes a reinforcing side wall 51, a reinforcing front wall 52, a reinforcing rear wall 53, a reinforcing front flange 54, and a reinforcing rear flange 55.

The reinforcing side wall 51 is disposed in the front-rear direction of the vehicle body in a state of being spaced apart inward in the vehicle width direction (that is, the vehicle interior side) with respect to the left inner wheel house 31. The reinforcing front wall 52 is bent from the front side of the reinforcing side wall 51 toward the left inner wheel house 31 (that is, the outer side in the vehicle width direction). That is, the reinforcing front wall 52 is formed on the front side of the vehicle body of the left wheel house reinforcing member 41 to face the vehicle width direction.

The reinforcing rear wall 53 is bent from the rear side of the reinforcing side wall 51 toward the left inner wheel house 31 (that is, the outer side in the vehicle width direction). That is, the reinforcing rear wall 53 is formed on the rear side of the vehicle body of the left wheel house reinforcing member 41 to face the vehicle width direction.

The reinforcing front flange 54 protrudes along the left inner wheel house 31 from the outer side of the reinforcing front wall 52 toward the front side of the vehicle body. The reinforcing rear flange 55 protrudes along the left inner wheel house 31 from the outer side of the reinforcing rear wall 53 toward the rear side of the vehicle body.

The left wheel house reinforcing member 41 is formed in a U-shaped cross section by the reinforcing side wall 51, the reinforcing front wall 52, and the reinforcing rear wall 53. The left wheel house reinforcing member 41 is formed in a hat-shaped cross section by the reinforcing side wall 51, the reinforcing front wall 52, the reinforcing rear wall 53, the reinforcing front flange 54, and the reinforcing rear flange 55.

The left wheel house reinforcing member 41 is connected to the left inner wheel house 31 from the inside in the vehicle width direction by joining the reinforcing front flange 54 and the reinforcing rear flange 55 to the left inner wheel house 31 from the inside in the vehicle width direction (that is, the vehicle interior).

In this state, the left wheel house reinforcing member 41 extends to be inclined upward from a left outer end portion 43a of the floor cross member 43 described later toward the rear of the vehicle in the vehicle width direction. Therefore, the reinforcing front wall 52 extends to be inclined upward from the left outer end portion 43a of the floor cross member 43 described later toward the vehicle rear side.

The left wheel house reinforcing member 41 forms the first closed cross section 56 together with the left inner wheel house 31 by joining the reinforcing front flange 54 and the reinforcing rear flange 55 to the left inner wheel house 31. The strength and rigidity of the left wheel house reinforcing member 41 are enhanced by forming the first closed cross section 56 by the left wheel house reinforcing member 41 and the left inner wheel house 31. Therefore, the left inner wheel house 31 is reinforced by the left wheel house reinforcing member 41.

As illustrated in FIG. 1, the right wheel house reinforcing member 42 is substantially symmetrical with respect to the left wheel house reinforcing member 41. Therefore, a detailed description of the right wheel house reinforcing member 42 will be omitted below.

(Floor Cross Member)

Figure 5:
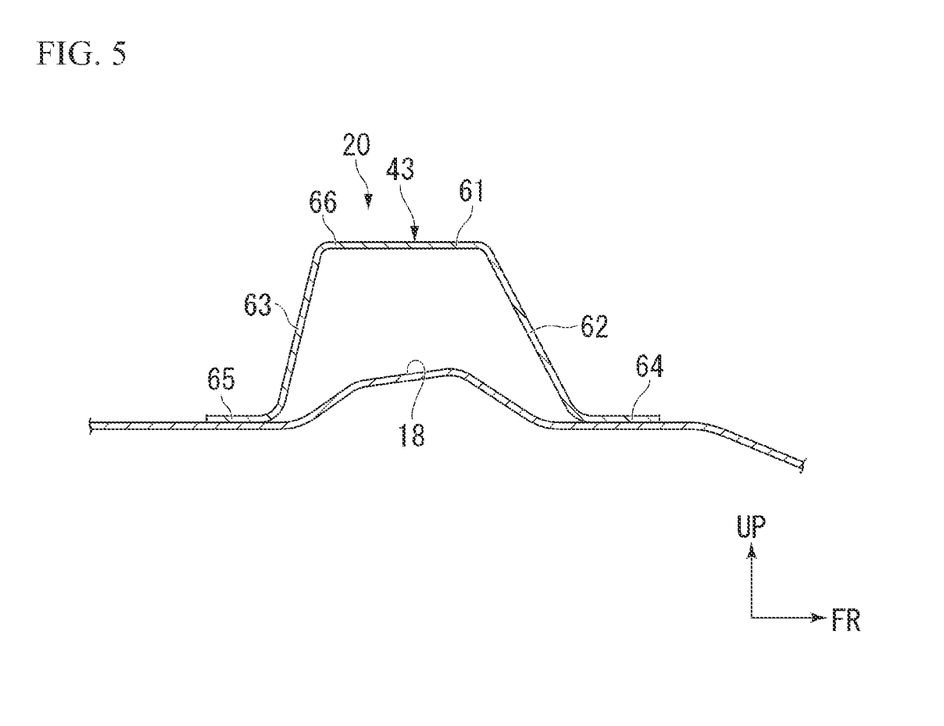
FIG. 5 is a cross-sectional view along line V-V in FIG. 3.

As illustrated in FIGS. 1, 3, and 5, the floor cross member 43 is bridged between the left rear frame 12 and the right rear frame 13 in a state of extending in the vehicle width direction.

In the floor cross member 43, for example, a left outer end portion 43a is connected to a lower end portion 31a of the left inner wheel house 31, the left rear frame 12, and a left side portion 18a of the rear floor panel 18 from the vehicle interior side. In the floor cross member 43, for example, a right outer end portion 43b is connected to a lower end portion 33a of the right inner wheel house 33, the right rear frame 13, and a right side portion 18b of the rear floor panel 18 from the vehicle interior side. Furthermore, the floor cross member 43 has a central portion 43c connected to the rear floor panel 18 from the vehicle interior side.

The left outer end portion 43a of the floor cross member 43 and the right outer end portion 43b of the floor cross member 43 are substantially symmetrical members. Therefore, hereinafter, the left outer end portion 43a of the floor cross member 43 will be described in detail, and the right outer end portion 43b of the floor cross member 43 will not be described in detail.

Hereinafter, the lower end portion 31a of the left inner wheel house 31 may be referred to as "left wheel house lower end portion 31a," and the lower end portion 33a of the right inner wheel house 33 may be referred to as "right wheel house lower end portion 33a".

Specifically, the floor cross member 43 includes a cross member top portion 61, a cross member front wall 62, a cross member rear wall 63, a cross member front flange 64, and a cross member rear flange 65.

The cross member top portion 61 is formed at an interval on the vehicle interior side with respect to the left wheel house lower end portion 31a, the right wheel house lower end portion 33a, the left rear frame 12, the right rear frame 13, and the rear floor panel 18. The cross member top portion 61 is disposed in the front-rear direction of the vehicle body. The cross member top portion 61 is connected to the reinforcing side wall 51 in a state where the left end portion thereof is overlapped with the lower end portion of the reinforcing side wall 51 of the left wheel house reinforcing member 41. The cross member top portion 61 is connected to the reinforcing side wall in a state where the right end portion thereof is overlapped with the lower end portion of the reinforcing side wall of the right wheel house reinforcing member 42.

The cross member front wall 62 is bent from the front side of the cross member top portion 61 toward the left and right wheel house lower end portions 31a and 33a, the left and right rear frames 12 and 13, and the rear floor panel 18. The cross member front wall 62 is connected to the reinforcing front wall 52 in a state where the left end portion thereof is overlapped with the lower end portion of the reinforcing front wall 52 of the left wheel house reinforcing member 41. The cross member front wall 62 is connected to the reinforcing front wall in a state where the right end portion thereof is overlapped with the lower end portion of the reinforcing front wall of the right wheel house reinforcing member 42.

The cross member rear wall 63 is bent from the rear side of the cross member top portion 61 toward the left and right wheel house lower end portions 31a and 33a, the left and right rear frames 12 and 13, and the rear floor panel 18. The cross member front wall 62 is connected to the reinforcing rear wall 53 in a state where the left end portion thereof is overlapped with the lower end portion of the reinforcing rear wall 53 of the left wheel house reinforcing member 41. The cross member front wall 62 is connected to the reinforcing rear wall in a state where the right end portion thereof is overlapped with the lower end portion of the reinforcing rear wall of the right wheel house reinforcing member 42.

The cross member front flange 64 projects from the lower side of the cross member front wall 62 toward the front side of the vehicle body along the left and right wheel house lower end portions 31a and 33a, the left and right rear frames 12 and 13, and the rear floor panel 18. The cross member front flange 64 is connected to the reinforcing front flange 54 in a state where the left end portion thereof is overlapped with the lower end portion of the reinforcing front flange 54 of the left wheel house reinforcing member 41. The cross member front flange 64 is connected to the reinforcing front flange in a state where the right end portion thereof is overlapped with the lower end portion of the reinforcing front flange of the right wheel house reinforcing member 42.

The cross member rear flange 65 projects from the lower side of the cross member rear wall 63 toward the rear side of the vehicle body along the left and right wheel house lower end portions 31a and 33a, the left and right rear frames 12 and 13, and the rear floor panel 18. The cross member rear flange 65 is connected to the reinforcing rear flange 55 in a state where the left end portion thereof is overlapped with the lower end portion of the reinforcing rear flange 55 of the left wheel house reinforcing member 41. The cross member rear flange 65 is connected to the reinforcing rear flange in a state where the right end portion thereof is overlapped with the lower end portion of the reinforcing rear flange of the right wheel house reinforcing member 42.

The floor cross member 43 is formed in a U-shaped cross section by the cross member top portion 61, the cross member front wall 62, and the cross member rear wall 63. The floor cross member 43 is formed in a hat-shaped cross section by the cross member top portion 61, the cross member front wall 62, the cross member rear wall 63, the cross member front flange 64, and the cross member rear flange 65.

In the floor cross member 43, the cross member front flange 64 and the cross member rear flange 65 are joined to the left and right wheel house lower end portions 31a and 33a, the left and right rear frames 12 and 13, and the rear floor panel 18 from the inside in the vehicle width direction. Therefore, the floor cross member 43 is connected to the left and right wheel house lower end portions 31a and 33a, the left and right rear frames 12 and 13, and the rear floor panel 18 from the inside in the vehicle width direction.

In this state, the floor cross member 43 forms a second closed cross section 66 together with the left and right wheel house lower end portions 31a and 33a, the left and right rear frames 12 and 13, and the rear floor panel 18. That is, the floor cross member 43 has increased strength and rigidity. Therefore, the left and right wheel house lower end portions 31a and 33a, the left and right rear frames 12 and 13, and the rear floor panel 18 are reinforced by the floor cross member 43.

Figure 6:
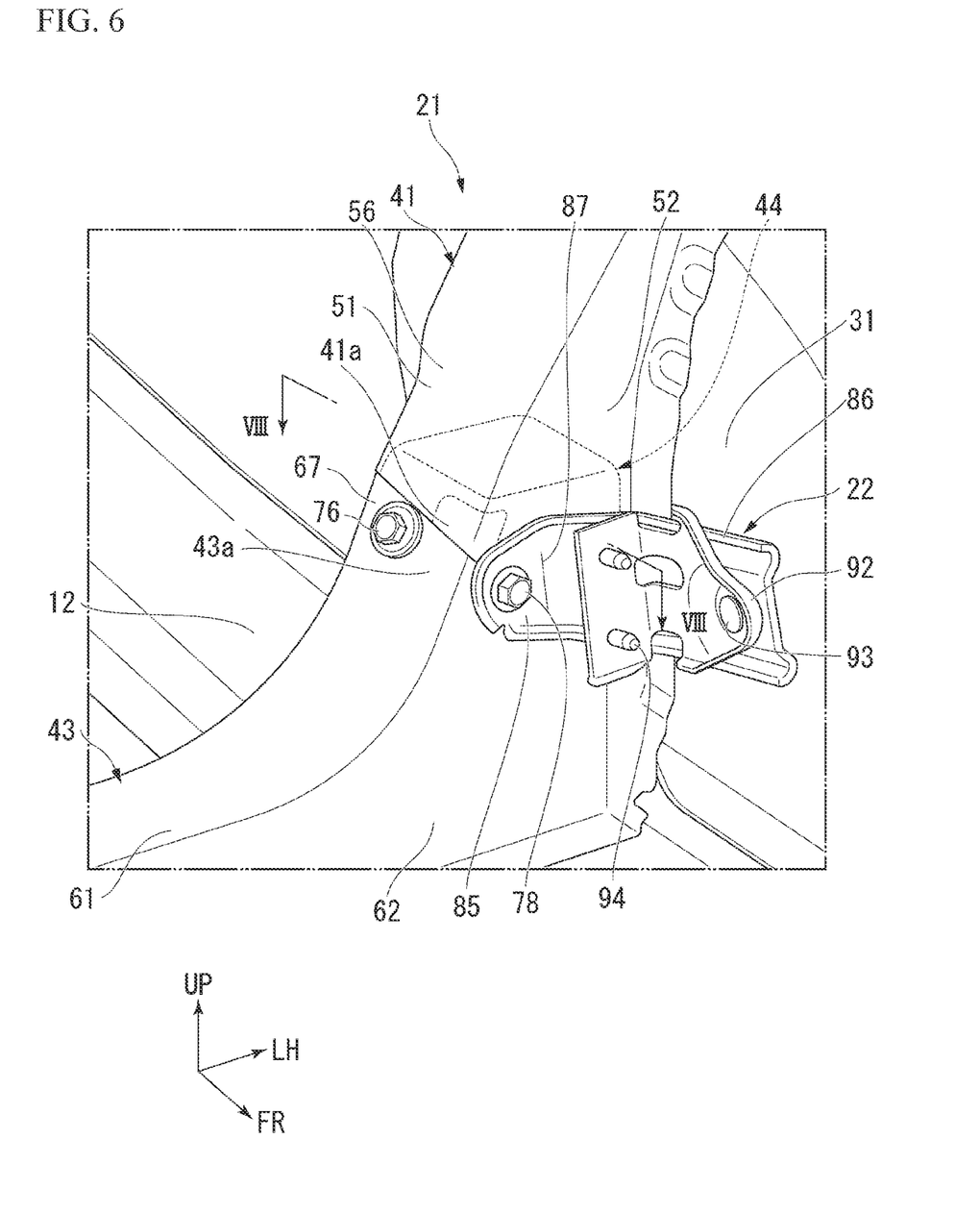
FIG. 6 is a perspective view illustrating a reinforcing member and a fixing member provided in the seat connection structure of the embodiment.

Here, as illustrated in FIGS. 1 and 6, the floor cross member 43 is overlapped such that the left outer end portion 43a covers the lower end portion 41a of the left wheel house reinforcing member 41 from the vehicle interior side. The floor cross member 43 is overlapped such that the right outer end portion 43b covers the lower end portion of the right wheel house reinforcing member 42 from the vehicle interior side.

Hereinafter, a portion where the left outer end portion 43a of the floor cross member 43 and the lower end portion 41a of the left wheel house reinforcing member 41 overlap with each other may be referred to as a "left overlapping portion (overlapping portion) 67". A portion where the right outer end portion 43b of the floor cross member 43 and the lower end portion of the right wheel house reinforcing member 42 overlap with each other may be referred to as a "right overlapping portion (overlapping portion) 68".

In this manner, the floor cross member 43 and the left wheel house reinforcing member 41 overlap each other at the left overlapping portion 67, and the floor cross member 43 and the right wheel house reinforcing member 42 overlap each other at the right overlapping portion 68. Therefore, the second closed cross section 66 communicates with the first closed cross section 56 of the left wheel house reinforcing member 41 and the first closed cross section of the right wheel house reinforcing member 42. Thus, the strength and rigidity of the floor cross member 43, the left wheel house reinforcing member 41, and the right wheel house reinforcing member 42 (that is, the reinforcing member 21) are secured. Therefore, the left inner wheel house 31, the right inner wheel house 33, and the rear floor panel 18 are reinforced by the reinforcing member 21.

The reinforcing member 21 is provided with the left wheel house reinforcing member 41 corresponding to the left inner wheel house 31, and is provided with the right wheel house reinforcing member 42 corresponding to the right inner wheel house 33. That is, a pair of the left wheel house reinforcing member 41 and a pair of the right wheel house reinforcing member 42 are provided on the left and right sides in the vehicle width direction. In the reinforcing member 21, the floor cross member 43 is connected (joined) to the lower end portion 41a of the left wheel house reinforcing member 41 and the lower end portion of the right wheel house reinforcing member 42.

Therefore, the reinforcing member 21 is formed in a U-shape in a front view from the vehicle front direction by the left wheel house reinforcing member 41, the right wheel house reinforcing member 42, and the floor cross member 43.

In the embodiment, an example in which the left inner wheel house 31, the right inner wheel house 33, and the rear floor panel 18 are reinforced by the reinforcing member 21 will be described, but the present invention is not limited thereto. As another example, one of each inner wheel house and the rear floor panel 18 may be reinforced by the reinforcing member 21, for example.

(Bulkhead)

Figure 7:
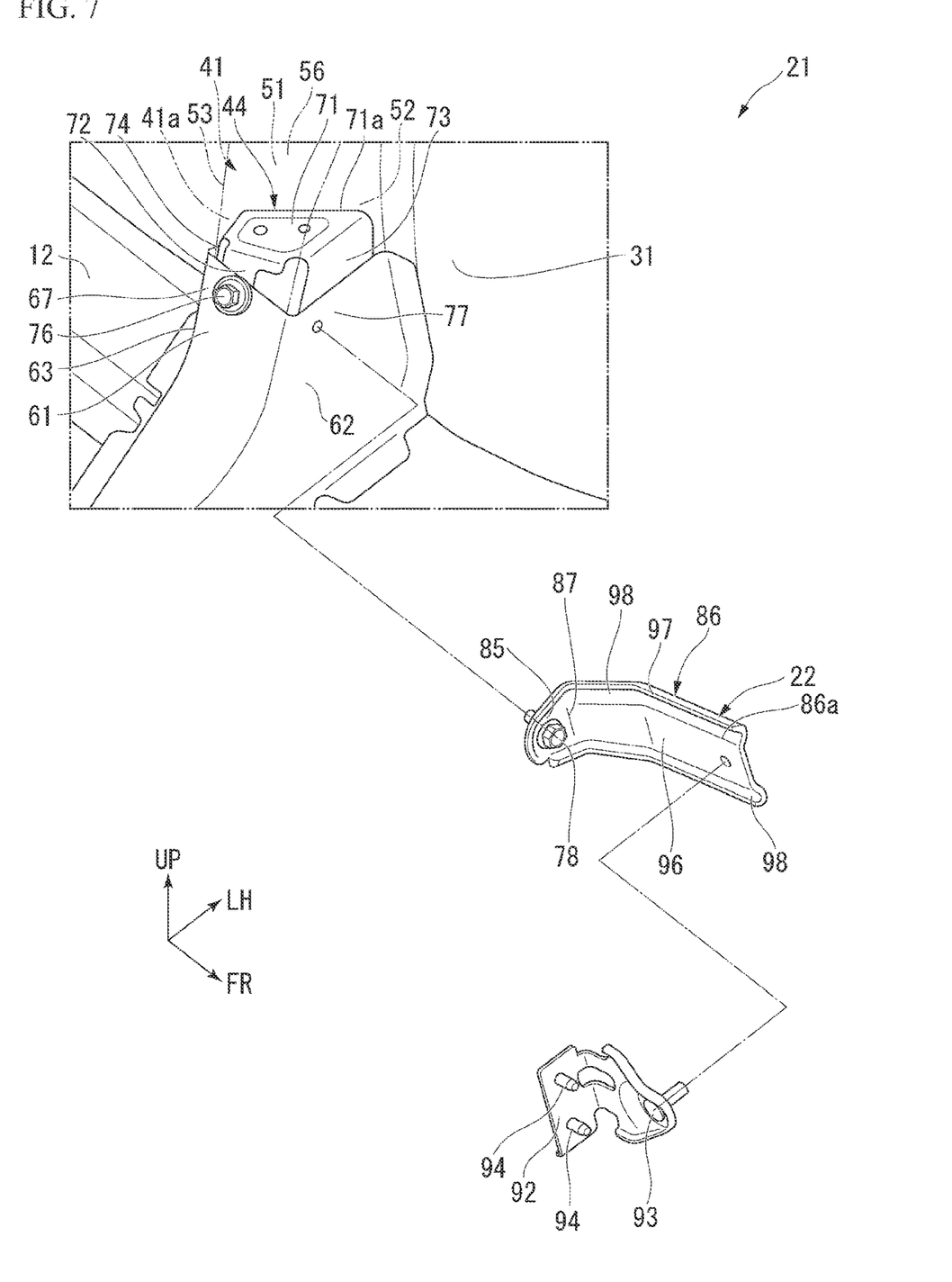
FIG. 7 is an exploded perspective view of the reinforcing member and the fixing member in FIG. 6.
Figure 8:
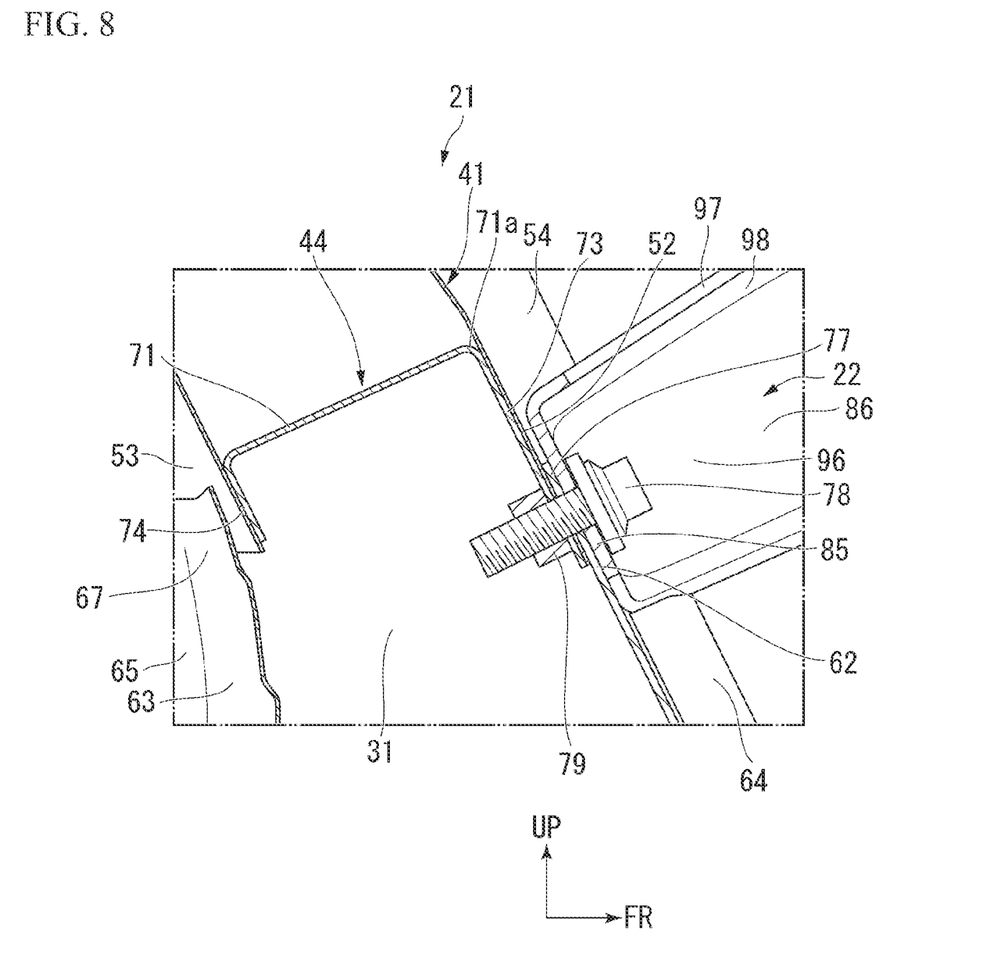
FIG. 8 is a cross-sectional view along line VIII-VIII in FIG. 6.

As shown in FIGS. 6 to 8, the left bulkhead 44 is provided inside the first closed cross section 56. The left bulkhead 44 has a partition wall 71, a first leg portion 72, a second leg portion 73, and a third leg portion 74.

The partition wall 71 is disposed at the lower end portion 41a of the left wheel house reinforcing member 41 inside the first closed cross section 56. An outer periphery 71a of the partition wall 71 is formed in a substantially rectangular shape along the inner peripheral surface of the left wheel house reinforcing member 41.

The first leg portion 72 is bent downward in a state of being overlapped with the reinforcing side wall 51 from a first side facing the reinforcing side wall 51 in the outer periphery 71a of the partition wall 71. The first leg portion 72 is connected to a portion of the left overlapping portion 67 where the reinforcing side wall 51 and the cross member top portion 61 overlap with each other by, for example, a bolt 76 and a welding nut (not illustrated). The welding nut is welded to the rear surface of the first leg portion 72.

The second leg portion 73 is bent downward in a state of being overlapped with the reinforcing front wall 52 from a second side facing the reinforcing front wall 52 in the outer periphery 71a of the partition wall 71. The second leg portion 73 overlaps a front surface portion 77 (that is, the front surface portion 77 of the reinforcing member 21) of the left overlapping portion 67 where the reinforcing front wall 52 and the cross member front wall 62 are overlapped. The second leg portion 73 is simultaneously connected together with a left fixing member 22 (described later) by, for example, a bolt 78 and a welding nut 79. The welding nut 79 is welded to the rear surface of the second leg portion 73.

The front surface portion 77 is formed on the front side of the vehicle body to face the vehicle width direction, and is inclined upward like the reinforcing front wall 52.

The third leg portion 74 is bent downward in a state of being overlapped with the reinforcing rear wall 53 from a third side facing the reinforcing rear wall 53 in the outer periphery 71a of the partition wall 71. The third leg portion 74 is overlapped with a portion of the left overlapping portion 67 where the reinforcing rear wall 53 and the cross member rear wall 63 are overlapped.

The left bulkhead 44 is disposed at the lower end portion 41a of the left wheel house reinforcing member 41 inside the first closed cross section 56, for example, by connecting the first leg portion 72 and the second leg portion 73 to the left overlapping portion 67. Thus, the lower end portion 41a of the left wheel house reinforcing member 41 is reinforced by the left bulkhead 44.

As illustrated in FIG. 1, the right bulkhead 45 is also provided inside the first closed cross section at the lower end portion of the right wheel house reinforcing member 42 similarly to the first closed cross section 56 of the left wheel house reinforcing member 41. The right bulkhead 45 is a substantially symmetrical member with the left bulkhead 44, and a detailed description thereof will be omitted.

In the embodiment, an example in which the left bulkhead 44 is provided inside the first closed cross section 56 of the left wheel house reinforcing member 41 and the right bulkhead 45 is provided inside the first closed cross section of the right wheel house reinforcing member 42 will be described, but the present invention is not limited thereto. As another example, for example, a bulkhead may be provided inside the second closed cross section 66 of the floor cross member 43. Alternatively, a bulkhead may be provided on each of the first closed cross section 56 of the left wheel house reinforcing member 41, the first closed cross section of the right wheel house reinforcing member 42, and the second closed cross section 66 of the floor cross member 43.

[Fixing Member]

As illustrated in FIGS. 2 and 6, the left fixing member 22 is a member that connects a left side portion 103a (see FIG. 3) of a seat back 103 of the rear seat 25 described later to the left overlapping portion 67 of the reinforcing member 21. The left fixing member 22 includes a first fixing portion 85, a second fixing portion 86, and a bending portion 87.

As illustrated in FIGS. 7 and 8, the first fixing portion 85 is disposed along the left end portion of the cross member front wall 62 and is connected to face the left end portion of the cross member front wall 62. Specifically, the first fixing portion 85 overlaps the second leg portion 73 of the left bulkhead 44 and the front surface portion 77 of the left overlapping portion 67, and is simultaneously connected by, for example, the bolt 78 and the welding nut 79.

As illustrated in FIGS. 2 and 7, the second fixing portion 86 extends toward the front side of the vehicle body from an end portion of the first fixing portion 85 on the outer side in the vehicle width direction toward the seat back 103 (described later). The first fixing portion 85 is in contact with a left end portion of the cross member front wall 62 (that is, the front surface portion 77 of the overlapping portion 67). The left end portion of the cross member front wall 62 overlaps the lower end portion of the reinforcing front wall 52.

That is, the second fixing portion 86 extends toward the front side of the vehicle body from the lower end portion of the reinforcing front wall 52 toward the left side portion 103a (see FIG. 3) of the seat back 103 in the direction perpendicular to the front surface portion 77 of the overlapping portion 67.

A front end portion 86a of the second fixing portion 86 is rotatably (rotatably) connected to a seat bracket (that is, the seat hinge) 92 by a support shaft 93. Hereinafter, the front end portion 86a of the second fixing portion 86 may be referred to as a "connection portion 86a".

The seat bracket 92 is fixed to the left side portion 103a of the seat back 103 with a bolt 94. That is, the connection portion 86a of the second fixing portion 86 is connected to the left side portion 103a (see FIG. 3) of the seat back 103 via the seat bracket 92 so as to be rotatable (rotatable) by the support shaft 93.

The second fixing portion 86 has a first bead portion (bead portion) 96. The first bead portion 96 extends from the connection portion 86a to a bending portion 87 (described later) along the longitudinal direction of the second fixing portion 86. The first bead portion 96 is formed to have a recessed cross section so as to be recessed inward in the vehicle width direction. The strength and rigidity of the second fixing portion 86 are secured by the first bead portion 96.

The bending portion 87 is formed by an intersection of the first fixing portion 85 and the second fixing portion 86. The bending portion 87 is formed by, for example, an intersection where the first fixing portion 85 and the second fixing portion 86 intersect each other to be substantially orthogonal to each other.

That is, for example, the first fixing portion 85 and the second fixing portion 86 are bent to form an L-shape in a plan view by the first fixing portion 85, the second fixing portion 86, and the bending portion 87. The left fixing member 22 (that is, the first fixing portion 85, the second fixing portion 86, and the bending portion 87) has a flange 97 forming an outer peripheral edge. The flange 97 protrudes from the vicinity of the outer peripheral edge toward the vehicle interior. Therefore, the strength and rigidity of the left fixing member 22 (that is, the first fixing portion 85, the second fixing portion 86, and the bending portion 87) are secured by the flange 97.

For example, the second fixing portion 86 and the bending portion 87 of the left fixing member 22 have second bead portions (other bead portions) 98. The second bead portion 98 is formed along the first bead portion 96 between the upper outer peripheral edge (that is, the flange 97) and the first bead portion 96 in the second fixing portion 86 and the bending portion 87, for example.

Furthermore, the second bead portion 98 is formed along the first bead portion 96 between the lower outer peripheral edge (that is, the flange 97) and the first bead portion 96 in the second fixing portion 86 and the bending portion 87, for example. The second bead portion 98 is formed in a recessed shape so as to be recessed toward the outside of the vehicle interior (that is, toward the outside in the vehicle width direction.

In the embodiment, an example in which the second bead portion 98 is formed in the second fixing portion 86 and the bending portion 87 of the left fixing member 22 will be described, but the present invention is not limited thereto. As another example, for example, the second bead portion 98 may be formed in the first fixing portion 85, the second fixing portion 86, and the bending portion 87 of the left fixing member 22.

As illustrated in FIGS. 1 and 2, the right fixing member 23 is a member that connects a right side portion of a seat back 103 of the rear seat 25 described later to a right overlapping portion 68 of the reinforcing member 21. The right fixing member 23 is a member configured to be substantially symmetrical with respect to the left fixing member 22, and a detailed description thereof will be omitted.

[Rear Seat]

The seat back 103 of the rear seat 25 is rotatably (rotatably) supported by the left fixing member 22 and the right fixing member 23 via a support shaft. That is, the rear seat 25 is disposed in front of the vehicle body of the reinforcing member 21, and is connected to the reinforcing member 21 via the left fixing member 22 and the right fixing member 23.

The rear seat 25 is, for example, a bench seat, and includes a seat cushion 102, a seat back 103, and a headrest 104.

As described above, according to the seat connection structure 20 of the embodiment, the following operations and effects can be obtained. In the following description, left side components of the vehicle 10 will be described, and description of right side components will be omitted.

As illustrated in FIGS. 2 and 6, the seat back 103 is connected to the front surface portion 77 of the reinforcing member 21 via the left fixing member 22. Here, the front surface portion 77 is formed on the front side of the vehicle body to face the vehicle width direction. Therefore, by connecting the left fixing member 22 to the front surface portion 77, the strength and rigidity of the left fixing member 22 against the load of the vehicle body in the front-rear direction can be enhanced.

Thus, for example, the load F the vehicle body in the front-rear direction of input to the rear seat 25 (specifically, the seat back 103) in the event of a frontal collision can be efficiently transmitted (released) from the left fixing member 22 to the reinforcing member 21 (that is, the vehicle body).

Similar actions and effects can be obtained even in the case of a load input by the rear collision. In the embodiment, a load F input by the front collision will be described as an example, and the description of the load input by the rear collision will be omitted.

Hereinafter, the front collision may be abbreviated as "collision," and the load F of the vehicle body in the front-rear direction may be abbreviated as "load F".

In order to efficiently transmit the load F from the left fixing member 22 to the reinforcing member 21, for example, it is not necessary to reinforce the left fixing member 22 with a new reinforcing member or to increase the shape of the left fixing member 22 to increase the strength and rigidity of the left fixing member 22, and the weight can be reduced. As a result, an increase in the number of components and an increase in size can be suppressed, and the load F input to the seat back 103 by the collision can be transmitted to the reinforcing member 21 (that is, the vehicle body). Therefore, it is possible to prevent the left fixing member 22 from being deformed or damaged by the load F.

As illustrated in FIGS. 3 and 8, the reinforcing member 21 includes the left wheel house reinforcing member 41 and the floor cross member 43. The left fixing member 22 is connected to the left overlapping portion 67 where the left wheel house reinforcing member 41 and the floor cross member 43 overlap. Therefore, for example, when the left overlapping portion 67 is joined, the left fixing member 22 can be overlapped on the left overlapping portion 67, and the overlapped members can be simultaneously connected.

That is, the strength and rigidity of the left fixing member 22 against the load F can be enhanced without reinforcing the left fixing member 22 with a new reinforcing member 21 or forming the shape of the left fixing member 22 large. Thus, the load F input from the seat back 103 due to the collision can be efficiently transmitted from the left fixing member 22 to the left wheel house reinforcing member 41 and the floor cross member 43 to be dispersed. Therefore, deformation and breakage of the left fixing member 22 due to the load F can be more favorably suppressed.

In addition, as illustrated in FIGS. 3 to 5, the first closed cross section 56 is formed by the left wheel house reinforcing member 41 and the left inner wheel house 31. The second closed cross section 66 is formed by the floor cross member 43 and the rear floor panel 18. Further, the first closed cross section 56 and the second closed cross section 66 are communicated with each other. Therefore, the strength and rigidity of the left wheel house reinforcing member 41 and the floor cross member 43 (that is, the reinforcing member 21) are secured.

Further, as illustrated in FIG. 1, the left wheel house reinforcing member 41, the right wheel house reinforcing member 42, and the floor cross member 43 form the reinforcing member 21 in a U-shape in a front view. Thus, the strength and rigidity of the reinforcing member 21 can be sufficiently secured.

That is, as illustrated in FIGS. 3 to 5, the load F input from the seat back 103 and the left fixing member 22 due to the collision can be efficiently supported by the reinforcing member 21 (that is, the vehicle body). As a result, it is possible to more favorably suppress deformation and breakage of the left fixing member 22 due to the load F without reinforcing the left fixing member 22 with a new reinforcing member 21 or forming the shape of the left fixing member 22 large.

Further, as illustrated in FIG. 1, the left wheel house reinforcing member 41, the right wheel house reinforcing member 42 (see FIG. 1), and the floor cross member 43 form the reinforcing member 21 in a U-shape, and the left fixing member 22 is connected to the reinforcing member 21. Therefore, for example, torsional rigidity of the reinforcing member 21 against a load input during traveling of the vehicle 10 can be increased. Thus, the stability of the rear seat 25 (see FIG. 2) while the vehicle 10 is traveling can be improved.

As illustrated in FIGS. 7 and 8, the left bulkhead 44 is provided inside the first closed cross section 56 of the left wheel house reinforcing member 41. Further, the second leg portion 73 of the left bulkhead 44 is simultaneously connected to the front surface portion 77 of the left overlapping portion 67 and the first fixing portion 85 of the left fixing member 22 in a state of being overlapped with each other. Thus, the left wheel house reinforcing member 41 (that is, the reinforcing member 21) can be reinforced by the left bulkhead 44.

As a result, the strength and rigidity of the reinforcing member 21 are further favorably secured, and the load F (see FIG. 2) input from the seat back 103 and the left fixing member 22 due to the collision can be more efficiently supported by the reinforcing member 21 (that is, the vehicle body).

Further, as illustrated in FIGS. 2 and 8, the seat back 103 is connected to the front surface portion 77 of the left overlapping portion 67 (that is, the front surface portion 77 of the reinforcing member 21) by the left fixing member 22. The left fixing member 22 extends to the seat back 103 along a direction perpendicular to the front surface portion 77. Therefore, the load F input to the seat back 103 by the collision can be more efficiently transmitted to the reinforcing member 21 by the left fixing member 22. As a result, the load F input to the seat back 103 by the collision can be more efficiently supported by the reinforcing member 21 (that is, the vehicle body).

In addition, as illustrated in FIGS. 2 and 7, the left fixing member 22 is formed in an L-shape by the first fixing portion 85 and the second fixing portion 86, and the outer peripheral edge of the left fixing member 22 is formed by the flange 97. Therefore, the strength and rigidity of the left fixing member 22 can be enhanced by the L-shape or the flange 97. As a result, the load F input to the seat back 103 by the collision can be more efficiently transmitted to the reinforcing member 21 (that is, the vehicle body) by the left fixing member 22.

The first bead portion 96 is formed in the second fixing portion 86 of the left fixing member 22. That is, the first bead portion 96 extends from the connection portion 86a of the second fixing portion 86 to the bending portion 87 (the bending portions 87 of the first fixing portion 85 and the second fixing portion 86 formed in an L-shape). Therefore, the strength and rigidity of the left fixing member 22 can be further enhanced. As a result, the load F input to the seat back 103 by the collision can be more efficiently transmitted to the reinforcing member 21 (that is, the vehicle body) by the left fixing member 22.

Further, the left fixing member 22 is formed in an L-shape by the first fixing portion 85, the second fixing portion 86, and the bending portion 87. In addition, for example, the second bead portion 98 is formed in the second fixing portion 86 and the bending portion 87 of the left fixing member 22. Therefore, the strength and rigidity of the left fixing member 22 can be enhanced by the L-shape or the second bead portion 98. As a result, the load F input to the seat back 103 by the collision can be more efficiently transmitted to the reinforcing member 21 (that is, the vehicle body) by the left fixing member 22.

The technical scope of the present invention is not limited to the above embodiments, and various modifications can be made without departing from the gist of the present invention.

For example, in the above embodiment, the portion where the reinforcing front wall 52 and the cross member front wall 62 are overlapped in the left overlapping portion 67 is exemplified as the front surface portion 77 of the reinforcing member 21, but the present invention is not limited thereto. As another example, for example, an arbitrary position of the left end portion of the reinforcing front wall 52 or the cross member front wall 62 may be set as the front surface portion 77 of the reinforcing member 21, and the left fixing member 22 may be connected to an arbitrary position.

In addition, it is possible to appropriately replace the constituent elements in the embodiment with well-known constituent elements without departing from the gist of the present invention, and the above-described modifications may be appropriately combined.

What is claimed is:

1. A seat connection structure comprising:
a reinforcing member that reinforces at least one of a floor and a wheel house; and
a seat disposed in front of a vehicle body of the reinforcing member and connected to the reinforcing member via a fixing member,
wherein the fixing member connects a seat back of the seat and the reinforcing member, and is connected to a front portion of the reinforcing member facing a front surface portion formed to face in a vehicle width direction on the front side of the vehicle body,
wherein the reinforcing member includes a wheel house reinforcing member that reinforces the wheel house and a floor cross member that reinforces the floor, and
wherein the fixing member is connected to an overlapping portion where the wheel house reinforcing member and the floor cross member overlap.

2. The seat connection structure according to claim 1, further comprising:
a first closed cross section formed by the wheel house reinforcing member and the wheel house; and
a second closed cross section formed by the floor cross member and the floor,
wherein the first closed cross section and the second closed cross section communicate with each other,
a pair of the wheel house reinforcing members are provided on the left and right sides in the vehicle width direction corresponding to the pair of wheel houses provided on the left and right sides in the vehicle width direction, and
the reinforcing member composed of the pair of the wheel house reinforcing members and the floor cross member is formed in a U-shape in a front view from a vehicle front direction.

3. The seat connection structure according to claim 2, wherein the reinforcing member includes a bulkhead provided in at least one of an inside of the first closed cross section and an inside of the second closed cross section, and
the bulkhead overlaps the overlapping portion and the fixing member and is simultaneously connected to the overlapping portion and the fixing member.

4. The seat connection structure according to claim 1, wherein the front surface portion extends to be inclined upward toward the rear of the vehicle, and
the fixing member extends from the front surface portion toward the seat back in a direction perpendicular to the front surface portion.

5. A seat connection structure comprising:
a reinforcing member that reinforces at least one of a floor and a wheel house; and
a seat disposed in front of a vehicle body of the reinforcing member and connected to the reinforcing member via a fixing member,
wherein the fixing member connects a seat back of the seat and the reinforcing member, and is connected to a front portion of the reinforcing member facing a front surface portion formed to face in a vehicle width direction on the front side of the vehicle body, and
wherein the fixing member includes a first fixing portion disposed along the front surface portion, and a second fixing portion which extends toward the seat back from an end portion of the first fixing portion on an outer side in the vehicle width direction and to which a connection portion is connected to the seat back, and has a flange formed in an L-shape in a plan view by the first fixing portion and the second fixing portion and forming an outer peripheral edge.

6. The seat connection structure according to claim 5, wherein the second fixing portion of the fixing member has a bead portion extending from the connection portion to a bending portion formed by the first fixing portion and the second fixing portion being intersected.

7. A seat connection structure comprising:
a reinforcing member that reinforces at least one of a floor and a wheel house; and
a seat disposed in front of a vehicle body of the reinforcing member and connected to the reinforcing member via a fixing member,
wherein the fixing member connects a seat back of the seat and the reinforcing member, and is connected to a front portion of the reinforcing member facing a front surface portion formed to face in a vehicle width direction on the front side of the vehicle body, and
wherein the fixing member includes a first fixing portion disposed along the front surface portion, and a second fixing portion which extends toward the seat back from an end portion of the first fixing portion on an outer side in the vehicle width direction, and has another bead portion formed in an L-shape in a plan view by the first fixing portion and the second fixing portion, and formed along the outer peripheral edge.

* * * * *